United States Patent
Schmidt et al.

(10) Patent No.: US 7,753,312 B2
(45) Date of Patent: Jul. 13, 2010

(54) LIGHTWEIGHT STRUCTURE ESPECIALLY FOR AN AIRCRAFT AND METHOD FOR MAKING SUCH A STRUCTURE

(75) Inventors: Hans-Juergen Schmidt, Buxtehude (DE); Alexei Vichniakov, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 366 days.

(21) Appl. No.: 10/888,565

(22) Filed: Jul. 8, 2004

(65) Prior Publication Data

US 2005/0112347 A1 May 26, 2005

(30) Foreign Application Priority Data

Jul. 8, 2003 (DE) ................... 103 30 708

(51) Int. Cl.
*B64C 1/00* (2006.01)
(52) U.S. Cl. .................... 244/119; 244/117 R
(58) Field of Classification Search ............. 119/119; 244/119, 117 R, 123.1; 428/292.1, 116
See application file for complete search history.

(56) References Cited

U.S. PATENT DOCUMENTS

| | | | |
|---|---|---|---|
| 1,775,386 A | 9/1930 | Blondin | |
| 3,058,704 A | 10/1962 | Bergstedt | |
| 3,071,217 A | 1/1963 | Gould | |
| 3,401,025 A | 9/1968 | Whitney | |
| 3,416,756 A * | 12/1968 | Windecker | 244/123.5 |
| 3,490,983 A * | 1/1970 | Lee | 428/113 |
| 3,700,517 A * | 10/1972 | Roach | 156/94 |
| 3,768,760 A * | 10/1973 | Jensen | 244/123.6 |
| 3,771,748 A | 11/1973 | Jones | |
| 3,885,071 A * | 5/1975 | Blad et al. | 428/60 |
| 3,995,081 A | 11/1976 | Fant et al. | |

(Continued)

FOREIGN PATENT DOCUMENTS

DE  102 38 460  3/2004

(Continued)

OTHER PUBLICATIONS

"Numerical Analysis of Crack Growth Phenomena in the Airplane Structures" Alexei Vichniakov, Hans-Juergen Schmidt, Bianka Schmidt-Brandecker, Sep. 29, 2003, Graz, Austria.

*Primary Examiner*—Michael R Mansen
*Assistant Examiner*—Joshua J Michener
(74) *Attorney, Agent, or Firm*—W. F. Fasse; W. G. Fasse

(57) ABSTRACT

A fiber reinforced strip is adhesively bonded to an outwardly facing surface of a reinforcing frame and to an inwardly facing outer skin surface. Such a strip position reduces crack propagation in a lightweight structure particularly in the outer skin adhesively bonded to the reinforcing frame through the strip. For this purpose the fiber reinforced strip is interposed between the outer skin and the frame and adhesively bonded to the outer skin and to the frame. The strip has reinforcing fibers extending in parallel to each other or the reinforcing fibers are woven into a fabric embedded in a synthetic adhesive bonding material. The embedding of the parallel fibers or of the fiber fabric in the bonding material is performed either prior to the bonding or during the bonding of the strip to the outer skin and to the reinforcing frame.

20 Claims, 3 Drawing Sheets

U.S. PATENT DOCUMENTS

| | | | |
|---|---|---|---|
| 4,015,035 A * | 3/1977 | Blad et al. .................... 428/60 |
| 4,052,523 A | 10/1977 | Rhodes et al. |
| 4,079,903 A | 3/1978 | Ashton et al. |
| 4,086,378 A * | 4/1978 | Kam et al. ................ 428/34.5 |
| 4,269,884 A * | 5/1981 | DellaVecchia et al. ...... 428/131 |
| 4,411,380 A | 10/1983 | McWithey et al. |
| 4,500,589 A * | 2/1985 | Schijve et al. ............... 428/213 |
| 4,615,733 A | 10/1986 | Kubo et al. |
| 4,811,540 A | 3/1989 | Kallies et al. |
| 5,087,511 A * | 2/1992 | Locey ......................... 428/218 |
| 5,106,668 A | 4/1992 | Turner et al. |
| 5,151,311 A | 9/1992 | Parente et al. |
| 5,176,729 A | 1/1993 | Bernard et al. |
| 5,200,256 A * | 4/1993 | Dunbar ....................... 428/212 |
| 5,223,067 A * | 6/1993 | Hamamoto et al. .......... 156/173 |
| 5,242,523 A * | 9/1993 | Willden et al. .............. 156/285 |
| 5,251,849 A | 10/1993 | Torres |
| 5,286,576 A * | 2/1994 | Srail et al. ................... 428/517 |
| 5,352,529 A | 10/1994 | Scanlon et al. |
| 5,429,326 A | 7/1995 | Garesché et al. |
| 5,451,377 A | 9/1995 | Asher et al. |
| 5,476,704 A | 12/1995 | Kohler |
| 5,498,129 A * | 3/1996 | Dequin et al. ............. 415/209.3 |
| 5,569,528 A | 10/1996 | Van der Loo et al. |
| 5,599,874 A * | 2/1997 | Singer et al. ................. 524/590 |
| 5,641,366 A * | 6/1997 | Hohman ....................... 156/62.8 |
| 5,645,670 A * | 7/1997 | Reinfelder et al. ........... 156/212 |
| 5,667,866 A | 9/1997 | Reese, Jr. |
| 5,693,157 A * | 12/1997 | Kingston ..................... 148/537 |
| 5,707,576 A * | 1/1998 | Asher .......................... 264/258 |
| 5,804,278 A | 9/1998 | Pike |
| 5,851,647 A * | 12/1998 | Foster ...................... 428/304.4 |
| 5,866,272 A * | 2/1999 | Westre et al. ................ 428/593 |
| 5,883,159 A * | 3/1999 | Koizumi et al. ............. 523/217 |
| 5,895,699 A | 4/1999 | Corbett et al. |
| 5,902,756 A | 5/1999 | Aly et al. |
| 5,919,177 A | 7/1999 | Georger et al. |
| 6,105,902 A | 8/2000 | Petit |
| 6,114,012 A | 9/2000 | Amaoka et al. |
| 6,114,050 A * | 9/2000 | Westre et al. ................ 428/608 |
| 6,119,742 A | 9/2000 | Maeng |
| 6,132,542 A * | 10/2000 | Cutler et al. .............. 156/89.11 |
| 6,190,484 B1 | 2/2001 | Appa |
| 6,230,465 B1 * | 5/2001 | Messenger et al. ............. 52/630 |
| 6,364,250 B1 * | 4/2002 | Brinck et al. ................. 244/119 |
| 6,458,309 B1 * | 10/2002 | Allen et al. .................. 264/319 |
| 6,511,570 B2 * | 1/2003 | Matsui ....................... 156/245 |
| 6,543,721 B2 | 4/2003 | Palm |
| 6,595,467 B2 | 7/2003 | Schmidt |
| 6,641,893 B1 * | 11/2003 | Suresh et al. ................ 428/105 |
| 6,648,273 B2 * | 11/2003 | Anast ......................... 244/119 |
| 6,655,633 B1 * | 12/2003 | Chapman, Jr. ........... 244/123.9 |
| 6,684,593 B2 | 2/2004 | Brenneis et al. |
| 6,702,911 B2 * | 3/2004 | Toi et al. ...................... 156/93 |
| 6,712,315 B2 | 3/2004 | Schmidt et al. |
| 6,889,937 B2 * | 5/2005 | Simpson et al. .......... 244/123.1 |
| 7,074,474 B2 * | 7/2006 | Toi et al. ..................... 428/102 |
| 7,093,470 B2 * | 8/2006 | El-Soudani ..................... 72/56 |
| 7,100,871 B2 | 9/2006 | Assler et al. |
| 7,124,797 B2 * | 10/2006 | Anderson et al. ........... 156/425 |
| 7,192,504 B2 * | 3/2007 | Healey ..................... 156/304.3 |
| 7,204,951 B2 * | 4/2007 | Simpson et al. ............. 264/523 |
| 7,226,559 B2 * | 6/2007 | Maxwell et al. ............. 264/511 |
| 2001/0015043 A1 * | 8/2001 | Brenneis et al. ............... 52/630 |
| 2001/0017336 A1 * | 8/2001 | Hirahara et al. ............. 244/123 |
| 2001/0051251 A1 * | 12/2001 | Noda et al. .................. 428/119 |
| 2002/0000492 A1 * | 1/2002 | Schmidt ..................... 244/125 |
| 2003/0042364 A1 * | 3/2003 | Tanaka et al. ............... 244/123 |
| 2003/0080251 A1 * | 5/2003 | Anast ......................... 244/119 |
| 2003/0114064 A1 * | 6/2003 | Fu et al. ..................... 442/239 |
| 2003/0168555 A1 * | 9/2003 | Livi et al. ................... 244/132 |
| 2003/0173460 A1 * | 9/2003 | Chapman, Jr. .............. 244/123 |
| 2003/0189357 A1 * | 10/2003 | Patberg et al. ........... 296/146.6 |
| 2004/0035979 A1 * | 2/2004 | McCoskey et al. ...... 244/117 R |
| 2004/0075023 A1 | 4/2004 | Assler et al. |
| 2004/0155148 A1 * | 8/2004 | Folkesson et al. ........... 244/119 |
| 2004/0244334 A1 * | 12/2004 | Kairouz ..................... 52/790.1 |
| 2005/0112348 A1 | 5/2005 | Schmidt et al. |
| 2005/0136256 A1 | 6/2005 | Vichniakov |
| 2006/0147690 A1 | 7/2006 | Vichniakov et al. |
| 2006/0156662 A1 | 7/2006 | Vichniakov |
| 2006/0261215 A1 | 11/2006 | Schimmler et al. |

FOREIGN PATENT DOCUMENTS

| | | |
|---|---|---|
| EP | 0 783 960 | 7/1997 |
| EP | 0 900 647 | 3/1999 |
| EP | 0 573 507 | 1/2000 |
| EP | 1 393 893 | 3/2004 |
| RU | 2 053 207 | 1/1996 |
| RU | 2 100 498 | 12/1997 |
| RU | 2 102 227 | 1/1998 |
| RU | 2 192 493 | 11/2002 |
| RU | 2 203 185 | 4/2003 |
| SU | 901 372 | 1/1982 |
| SU | 1 526 076 | 1/1992 |
| WO | WO92/12856 | 8/1992 |
| WO | WO92/15453 | 9/1992 |
| WO | WO97/25198 | 7/1997 |
| WO | WO98/53989 | 12/1998 |

* cited by examiner

LIGHTWEIGHT STRUCTURE ESPECIALLY FOR AN AIRCRAFT AND METHOD FOR MAKING SUCH A STRUCTURE

PRIORITY CLAIM

This application is based on and claims the priority under 35 U.S.C. §119 of German Patent Application 103 30 708.7, filed on Jul. 8, 2003, the entire disclosure of which is incorporated herein by reference.

FIELD OF THE INVENTION

Lightweight structures are used primarily in aircraft construction, particularly aircraft bodies including an outer skin adhesively bonded to a framework. The invention also relates to a method for constructing such a lightweight structure by adhesive bonding.

BACKGROUND INFORMATION

Lightweight structures for use in the aircraft and spacecraft technologies include an outer skin which is strengthened on its inner surface by a reinforcement or stiffening framework. Such a framework is in fact a three dimensional structure but may be referred to as being "two-dimensional" to distinguish the framework from a three-dimensional aircraft or spacecraft body. An aircraft body, for example, is constructed as a lightweight structure with an outer skin that is reinforced by longitudinally extending stringers and circumferentially extending ribs. The stringers and ribs are adhesively bonded to the inner surface of the outer skin. In designing such lightweight structures, particularly in the aircraft industry, a special value is allocated to reducing weight while simultaneously keeping in mind, depending on the particular type of use, the strength requirement, the fatigue requirement, and the tolerance against damages, referred to herein as damage tolerance. Further, lightweight structures used in the aircraft construction must meet special requirements regarding the damage tolerance that lightweight aircraft components must have for safety reasons.

Increasing the damage tolerance of such lightweight structures can be accomplished in different ways. One example involves increasing the entire skin thickness, or providing different skin thicknesses in different locations throughout the lightweight structure so that the skin is thicker in locations exposed to higher loads while the skin is thinner in locations exposed to lesser loads. Strengthening the skin by increasing the thickness of the skin even only locally, increases the overall weight more than is acceptable. Another possibility of increasing the skin strength resides in using materials which themselves have an improved damage tolerance. Such materials are disclosed in German Patent Publication DE 102 38 460 A1 and counterpart U.S. Pat. No. 7,100,871, which describes metallic laminated materials or fiber composite laminates which are on the market under the Trademark GLARE®.

Fiber reinforced metal laminates have the advantage of a very good damage tolerance combined with a relatively small density compared to monolithic metallic sheet materials. However, presently fiber reinforced metal laminates have a lower static strength characteristic compared to monolithic sheet metal materials. As a result, a weight reduction of the lightweight structure is only possible in a few areas where the particular component is primarily designed with regard to damage tolerant characteristics rather than strength characteristics. Furthermore, the production of fiber reinforced metal laminates is relatively expensive compared to the production of monolithic sheet metal materials due to the, at least partially, complicated pretreatment which the metal sheets require for the subsequent adhesive bonding operation and due to the use of additional prepreg films in the metal laminates and the need for manually positioning and preparing the individual laminae for the subsequent curing and adhesive bonding operation. As a result, the production costs can be significantly higher than the production costs of monolithic sheet metals. Significantly smaller costs are involved in the production of metallic laminate materials without fiber reinforcement as described in the above mentioned German Patent Publication DE 102 38 460 A1.

OBJECTS OF THE INVENTION

In view of the foregoing it is the aim of the invention to achieve the following objects singly or in combination:
  to improve the damage tolerance of fiber reinforced laminated sheet metal materials and of monolithic sheet metal materials;
  to improve the fatigue characteristics of such sheet metal materials by reducing crack formation and by retarding, crack propagation in these materials;
  to significantly reduce the crack propagation speed so that the structure remains serviceable for a longer period of time than was possible heretofore; and
  to provide a method for the production of such materials or lightweight structures made of these materials.

The invention further aims to avoid or overcome the disadvantages of the prior art, and to achieve additional advantages, as apparent from the present specification. The attainment of these objects is, however, not a required limitation of the present invention.

SUMMARY OF THE INVENTION

The above objects have been achieved according to the invention in a lightweight structure by adhesively bonding a fiber strengthened reinforcing strip between the outer skin and the strengthening support structure also referred to herein simply as frame. The reinforcing strip effectively retards the formation and propagation of cracks in the outer skin. The present lightweight structures are produced by embedding the fibers of the reinforcing strip either prior to or during the adhesive bonding into a synthetic material matrix which is preferably an adhesive bonding material.

It has been found that the teaching of the invention is equally applicable to outer skins made of sheet metal laminated materials, or of monolithic single ply sheet metal materials. These materials are used to form the outer skin of lightweight structures.

The use of reinforcing strips according to the invention between an outer skin of metallic laminate materials and the ribs and/or stringers of a frame, as compared to an embodiment with an outer skin made of a monolithic sheet metal material, has substantially reduced the propagation of cracks as long as the cracks do not get longer than approximately the spacing between two neighboring stringers. However, if the crack length approaches a length of about twice said spacing, the crack propagation reduction is more effective in a structure with an outer skin of a monolithic sheet metal material. Generally, the retardation of the crack propagation according to the invention can increase the useful life of a lightweight structure up to five times compared to conventional structures without an additional reinforcing layer between the outer skin and the stringers and/or ribs of the frame.

According to the invention not only the damage tolerance has been increased due to the retardation of the crack propagation, a weight reduction has also been achieved because it has been found that the use of the reinforcing strips between the outer skin and the ribs and/or stringers permits the use of thinner sheet metal layers for forming the outer skin. As a result the sheet metal thickness can be reduced up to 20% compared to conventionally used sheet metal thicknesses, thereby correspondingly reducing the total weight of the lightweight structure such as an aircraft body. This important advantage is particularly significant in connection with upper body skin sections of an aircraft body.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 6:
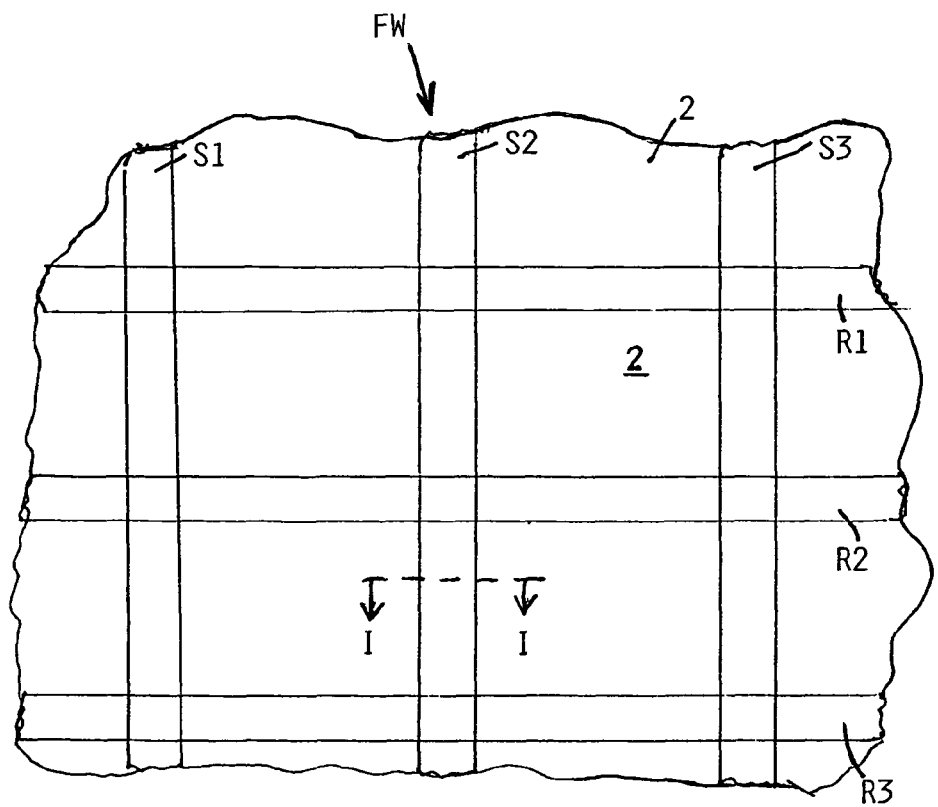
FIG. 6 shows a broken away plan view of ribs and stringers of an aircraft body lightweight structure with the view extending radially outwardly to clarify the position of the present reinforcing strips shown in FIGS. 1 to 4.

FIG. 6 shows a view onto a broken away section of an aircraft lightweight body structure including a frame or framework FW of ribs R1, R2, R3 extending circumferentially around the longitudinal aircraft axis while stringers S1, S2, S3 extend parallel to the longitudinal aircraft axis. The ribs and stringers are adhesively bonded to the inwardly facing surface of an outer skin 2. A plane extending perpendicularly to the plane of the sheet of the drawing and designated by arrows I-I illustrates the position of a reinforcing strip 1 in the perspective view of FIG. 1 between the outer skin 2 and a stringer S2 in the framework FW. More specifically, the reinforcement strips 1 according to the invention are positioned between the outer skin 2 and the ribs, or between the outer skin and the stringers or between the outer skin and the ribs and stringers.

Figure 1:
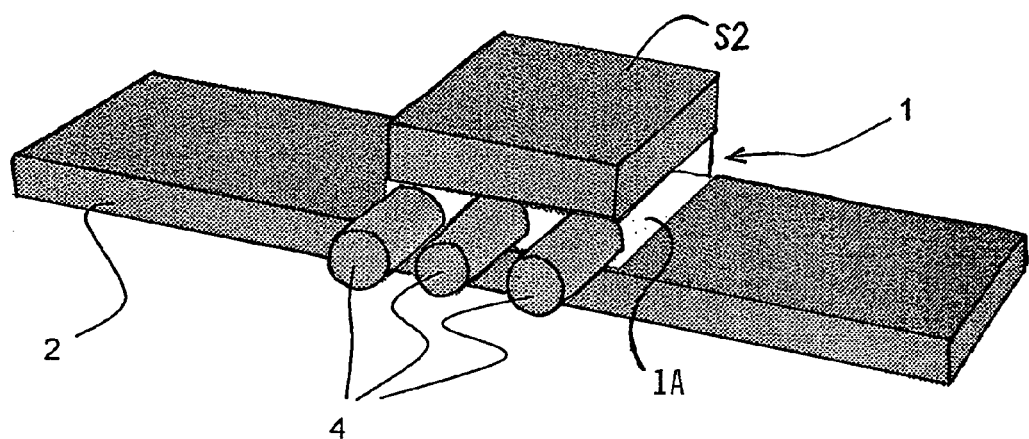
FIG. 1 is a perspective view in a direction toward a plane I-I shown in FIG. 6 showing a reinforcing strip of matrix embedded fibers between a stringer and an outer monolithic sheet metal skin.

FIG. 1 shows a reinforcing strip 1 bonded by an adhesive matrix 1A to an outer skin 2 and to a stringer S2. The reinforcing strip 1 comprises fibers 4 arranged in parallel to each other and embedded in the matrix 1A. The outer skin 2 is made of a monolithic sheet metal. The matrix 1A is an adhesive that, after curing, bonds the reinforcing strip 1 to the stringer S2 and to the outer skin. The fibers 4 in the matrix 1A retard any crack propagation thereby improving the damage tolerance and thus the service life of the lightweight structure.

Figure 2:
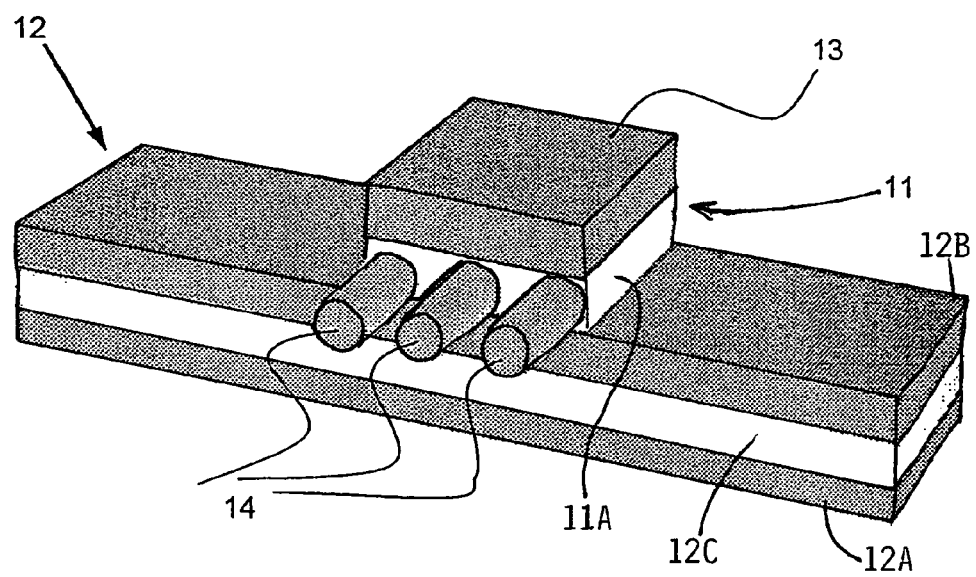
FIG. 2 is a view similar to that of FIG. 1, illustrating an outer skin of laminated sheet metals.

In FIG. 2 the outer skin 12 is a sandwich or laminated structure of two sheet metal layers 12A and 12B bonded to each other by an adhesive layer 12C. The reinforcing strip 11 is made of damage tolerant fibers 14 adhesively bonded in a matrix 11A between the outer skin 12 and the stringer 13. Crack propagation in the outer skin 12 is retarded or slowed down significantly by the present reinforcing strip 11 as will be explained below with reference to FIG. 5.

Figure 3:
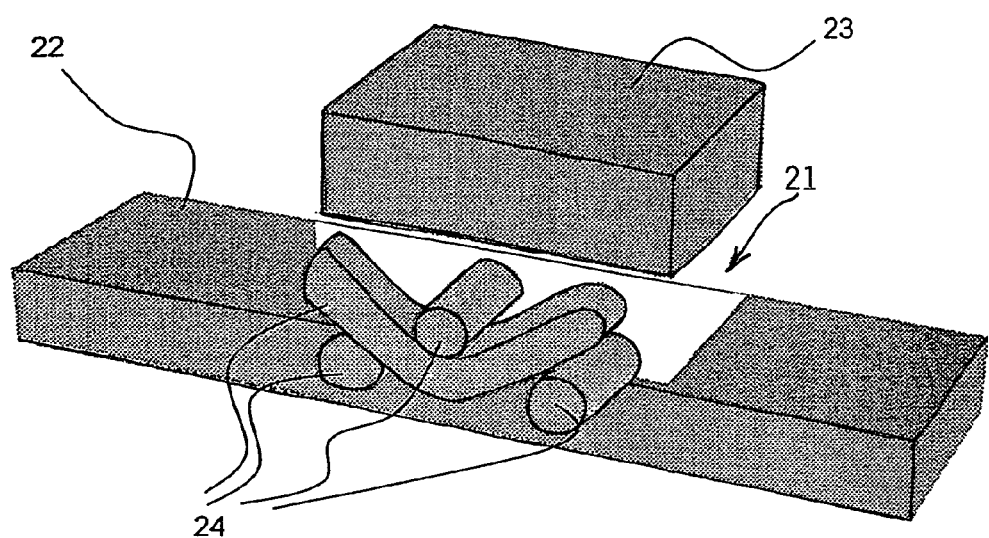
FIG. 3 is a view similar to that of FIG. 1, showing a reinforcing strip made of a matrix embedded woven fiber fabric and a single layer outer skin.

FIG. 3 shows an embodiment in which the outer skin 22 is a single monolithic sheet metal member as in FIG. 1. The reinforcing strip 21 comprises a fiber fabric, with weft fibers and warp fibers 24 embedded in an adhesively bonding matrix which simultaneously bonds the reinforcing strip 21 to the outer skin 22 and to the stringer 23.

Figure 4:
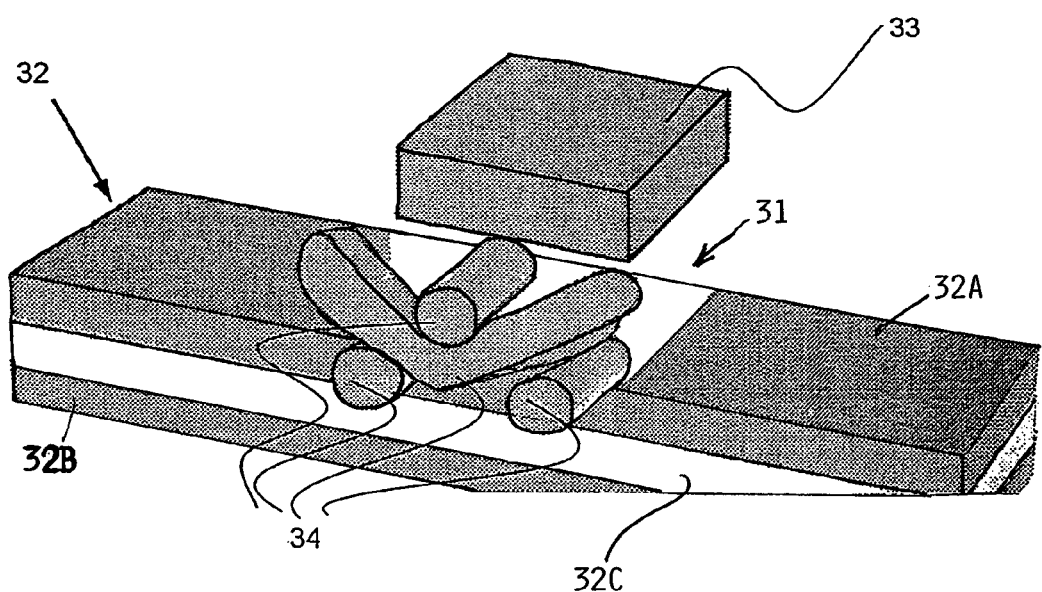
FIG. 4 is a view similar to that of FIG. 3, with a laminated outer skin.

FIG. 4 shows an embodiment in which the outer skin 32 is a laminated structure including for example two monolithic sheet metal layers 32A and 32B bonded to each other by an adhesive bonding layer 32C. Epoxy resin may be used for the bonding of the layers 32A and 32B to each other. Epoxy resin may also be used to embed the reinforcing fiber fabric 34 in a respective matrix which, upon curing, bonds the stringer 33 to the reinforcing strip 31 and the latter to the outer skin 32.

In each of FIGS. 1, 2, 3 and 4 the reinforcing strips 1, 11, 21 and 31 perform the function of increasing the damage tolerance characteristics of the entire lightweight structure, particularly the outer skin since the crack formation and crack propagation in the outer skin is at least retarded or slowed down. For this purpose the fibers of the reinforcing strips 1, 11, 21 and 31 should be oriented to cross a crack propagation direction.

In all embodiments shown in FIGS. 1 to 4, the width of the reinforcing strips 1, 11, 21 and 31 preferably corresponds to the width of the respective radially outwardly skin facing surface of the respective frame member e.g. a stringer or rib. Such width is preferably within the range of about 10 mm to about 80 mm. The reinforcing strips 1 and 11 shown in FIGS. 1 and 2 are preferably made of a monolithic sheet metal material, particularly an aluminum lithium alloy containing preferably 1% to 3% by weight of lithium or other high strength aluminum alloys. Magnesium alloys and titanium alloys are also suitable for manufacturing the single-ply or multi-ply laminated sheet metal material.

In addition to the strip width within the range of 10 to 80 mm, the reinforcing strips 1, 11, 21, 31 have a layer thickness including the bonding adhesive forming the matrix, for example 1A, 11A within the range of 0.05 mm to 0.3 mm. This strip thickness is smaller than the thickness of the stringers and ribs which is within the range of 0.6 mm to 2.0 mm.

The fibers are preferably made of glass fibers, carbon fibers, polyaromatic amide fibers, aluminum oxide fibers, silicon carbide fibers or basalt fibers. The fibers may also be metal wires such as aluminum wires, titanium wires or magnesium wires. Any type of fibers are embedded in a synthetic material matrix that is preferably also an adhesive bonding material such as epoxy resin. The embedding step may be performed prior or during the adhesive bonding. The fibers have a length of at least 10 mm and a diameter within the range of 0.001 mm to 0.3 mm.

Any adhesive bonding systems compatible with the fibers, stringers and ribs may be used for the present purposes. The reinforcing strips are preferably secured to the inner surface of the outer skin together with the ribs and/or stringers of the framework in a single adhesive bonding operation.

The outer skin is preferably formed of aluminum alloys particularly aluminum lithium alloys with about 1% to 3% by weight of lithium, magnesium alloys, and titanium alloys. Laminated materials comprising two or more adhesively bonded plies or such plies with an intermediate sheet metal layer are also suitable for producing the outer skin 2. Fiber reinforced plies combined with sheet metals or vice versa are equally suitable as outer skin for the present purpose.

Figure 5:
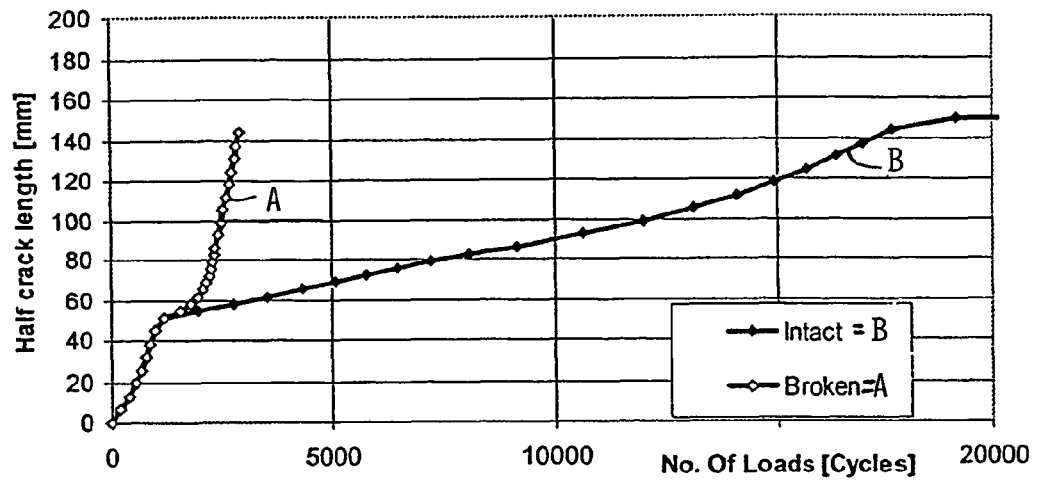
FIG. 5 shows two characteristic curves illustrating a half crack length as a function of applied load cycles based on a computer analysis using the finite element method.

FIG. 5 shows two curves A and B illustrating the crack propagation or half crack length in mm as a function of applied load cycles. Curve A shows a rapid propagation of a crack in a conventional lightweight structure even well prior to 5000 load cycles. Curve B represents a lightweight structure with is reinforcing strips 1, 11, 21, 31 between the outer skin and the framework FW as taught by the invention. Curve B shows a significant retarding of the propagation of a fatigue crack, whereby the damage tolerance and the useful life of the lightweight structure is correspondingly increased. More specifically, curve A in FIG. 5 shows that a crack propagation of about 140 mm is reached in a conventionally constructed lightweight structure at about 3000 load cycles. Curve B in FIG. 5 represents the improvement achieved by the invention. Curve B shows that a crack propagation of 140 mm is reached after about 17000 load cycles in a lightweight structure constructed according to the invention. Hence, the invention has achieved at least a fivefold improvement (17:3=5,666). The improvement has been achieved for monolithic and for laminated sheet metal skin structures.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A lightweight structure comprising an outer sheet metal material skin, a reinforcing frame including ribs and stringers, said ribs and stringers having skin facing surfaces having a width within the range of 10 to 80 mm, said outer sheet metal material skin comprising a sheet metal material wherein cracks can occur, wherein said sheet metal material is selected from the group consisting of aluminum alloy, magnesium alloy, titanium alloy and fiber metal laminates, and at least one fiber reinforced crack propagation retarding strip interposed between said outer sheet metal material skin and said skin facing surfaces of any one of said ribs and stringers forming said reinforcing frame, said at least one fiber reinforced crack propagation retarding strip having a strip width within said range of 10 to 80 mm of said skin facing surfaces, and an adhesive bond between said at least one fiber reinforced crack propagation retarding strip and said outer sheet metal material skin and a further adhesive bond between a respective skin facing surface of any one of said ribs and stringers forming said reinforcing frame and said at least one fiber reinforced crack propagation retarding strip.

2. The lightweight structure of claim 1, wherein said at least one fiber reinforced crack propagation retarding strip comprises fibers embedded in a matrix, said fibers extending in parallel to each other.

3. The lightweight structure of claim 1, wherein said at least one fiber reinforced crack propagation retarding strip comprises fibers woven into a fabric embedded in a matrix, said fibers crossing each other.

4. The lightweight structure of claim 1, wherein said at least one fiber reinforced crack propagation retarding strip comprises fibers embedded in a matrix material having a damage tolerant characteristic.

5. The lightweight structure of claim 4, wherein said fibers in said at least one fiber reinforced crack propagation retarding strip are selected from the group consisting of glass fibers, carbon fibers, polyaromatic amide fibers, aluminum oxide fibers, silicon carbide fibers and basalt fibers.

6. The lightweight structure of claim 4, wherein said fibers in said at least one fiber reinforced crack propagation retarding strip are metal wires selected from the group of aluminum wires, titanium wires, magnesium wires, and wires of alloys of these metals including aluminum lithium alloy wires.

7. The lightweight structure of claim 6, wherein said metal wires have a diameter within the range of 0.001 mm to 0.3 mm.

8. The lightweight structure of claim 4, wherein said fibers in said at least one fiber reinforced crack propagation retarding strip have a diameter within the range of 0.001 mm to 0.3 mm.

9. The lightweight structure of claim 1, wherein said at least one fiber reinforced crack propagation retarding strip has a strip thickness within the range of 0.05 mm to 0.3 mm following adhesive bonding.

10. The lightweight structure of claim 1, wherein said at least one fiber reinforced crack propagation retarding strip comprises fibers having a length of at least 10 mm.

11. The lightweight structure of claim 1, wherein said sheet metal material forming said outer skin is a monolithic single ply sheet metal.

12. The lightweight structure of claim 1, wherein said sheet metal material of said aluminum alloy is an aluminum lithium alloy.

13. The lightweight structure of claim 12, wherein said aluminum lithium alloy comprises 1% to 3% by weight of lithium.

14. An aircraft fuselage structure comprising:
   an outer skin comprising at least one sheet metal layer of a metal material selected from the group consisting of aluminum alloys, magnesium alloys and titanium alloys;
   a structural frame comprising plural ribs that are spaced apart from one another and plural stringers that are spaced apart from one another, wherein said stringers extend crosswise relative to said ribs with open fields to between and bounded by said ribs and said stringers to form a grid pattern of said structural frame, wherein said ribs and said stringers have outer surfaces thereof facing an inner surface of said outer skin, and wherein said outer surfaces of said ribs and said stringers each respectively is have a width within a range from 10 mm to 80 mm; and
   fiber reinforced composite strips of a fiber reinforced composite material arranged in a grid pattern between and adhesively bonded to said inner surface of said outer skin and said outer surfaces of said ribs and said stringers, wherein said fiber reinforced composite strips each respectively have a width within a range from 10 mm to 80 mm.

15. The aircraft fuselage structure according to claim 14, wherein said fiber reinforced composite strips are arranged only in said grid pattern along all of said outer surfaces of all of said ribs and said stringers, and no fiber reinforced composite material is arranged on areas of said inner surface of said outer skin in said open fields of said structural frame.

16. The aircraft fuselage structure according to claim 14, wherein said respective width of each respective one of said fiber reinforced composite strips respectively corresponds to said respective width of said respective outer surface of a respective one of said ribs and said stringers to which said respective fiber reinforced composite strip is adhesively bonded.

17. The aircraft fuselage structure according to claim 14, wherein said outer skin is a monolithic single-ply sheet metal skin that consists of one said sheet metal layer.

18. The aircraft fuselage structure according to claim 14, wherein said at least one sheet metal layer comprises plural sheet metal layers, and said outer skin is a multi-ply laminate comprising said plural sheet metal layers laminated to one another.

19. The aircraft fuselage structure according to claim 18, wherein said multi-ply laminate further comprises at least one fiber reinforced composite layer laminated between adjacent ones of said sheet metal layers.

20. The aircraft fuselage structure according to claim 14, wherein said fiber reinforced composite strips each respectively comprise fibers having a length of at least 10 mm embedded in a matrix material that adhesively bonds said fiber reinforced composite strips to said inner surface of said outer skin and to said outer surfaces of said ribs and said stringers.

* * * * *